Aug. 6, 1935.   L. G. SPETH   2,010,329
VALVE
Filed Dec. 29, 1932   2 Sheets-Sheet 1

LLOYD G. SPETH
INVENTOR

BY
ATTORNEY

Aug. 6, 1935.    L. G. SPETH    2,010,329
VALVE
Filed Dec. 29, 1932    2 Sheets-Sheet 2

LLOYD G. SPETH
INVENTOR
BY John E. Reinfer
ATTORNEY

Patented Aug. 6, 1935

2,010,329

UNITED STATES PATENT OFFICE 2,010,329

VALVE

Lloyd G. Speth, Claridon, Ohio, assignor to The Cleveland Pneumatic Tool Company, Cleveland, Ohio, a corporation of Ohio Application December 29, 1932, Serial No. 649,266

5 Claims. (Cl. 277—16)

This invention relates broadly to a compressed fluid controlling valve, but more particularly to a novel quick operating valve for controlling the admission and exhaust of compressed fluid into and from a plurality of pipes or conduits connected to fluid actuated devices of various types.

One object of this invention is to produce a valve of simple design and economic of manufacture wherein the movable parts are accessible without necessitating the disconnection of the many conduits attached to the valve casing, thus facilitating the inspection or service of these parts and consequently reducing the cost of maintenance.

Another object of this invention is to produce a valve of sturdy construction affording adequate wearing surfaces, thus increasing the life of the valve as well as reducing the cost of operation.

Other objects and advantages more or less ancillary to the foregoing reside in the specific construction and aggroupment of the elements peculiar to this structure, as will become apparent from a more complete examination of this specification.

In the drawings:—

Figure 1:
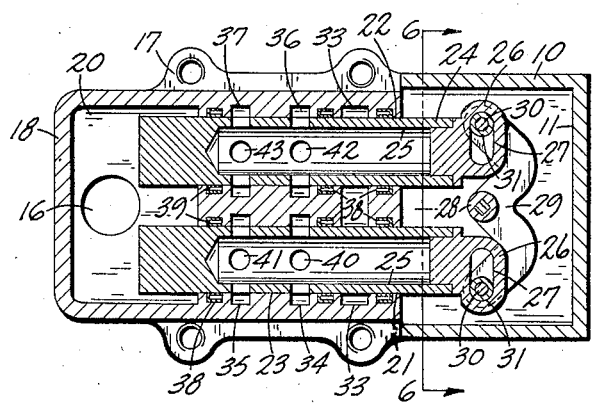
Fig. 1 is a longitudinal sectional view of the valve assembly illustrating the valves in neutral position.

Referring to the drawings in which like symbols designate corresponding parts throughout the several views, 10 represents the valve casing. The lower end of this casing forms a chamber 11, constituting a lubricant reservoir. The external end walls of the casing are properly cast to form apertured protruding lugs 12, through which bolts or screws may be inserted for securing the casing to any suitable support. The chamber 11 has one wall extending upwardly having on the exterior thereof a plurality of internally threaded bosses or connections 13, 14, 15, and 16. To the boss 13 may be secured the conduit admitting the fluid to be controlled by the valve. The bosses 14 and 15 are conveniently disposed to permit the conduits leading to the fluid actuated devices, to be connected thereto, while the boss 16 is capable to receive the exhaust conduit. Disposed on the margin of this last mentioned wall, there is a plurality of internally threaded lugs 17.

Detachably secured to the casing 10 by means of bolts in screw tight engagement with the screw threaded lugs 17, there is a valve block 18. The fluid tight joint between the casing and the valve block is assured by a gasket 19 clamped between them. The valve block 18 is preferably made of non-ferrous material, such as bronze, affording efficient bearing quality. The upper end thereof is provided with an enlarged cavity, hereafter designated as exhaust chamber 20, with which the threaded boss or connection 16 is in constant communication. Leading from the chamber 20 into the lubricant reservoir 11, there are two identical cylindrical bores 21 and 22, having reciprocably mounted therein the valves 23 and 24 formed with a valve chamber 25. The chambers 25 are closed by a cap 26 secured to the lower end of the valves 23 and 24. The caps 26 are provided with a laterally disposed slot 27, the purpose of which will be explained later.

Disposed adjacent to the ends of the valves 23 and 24, and rotatably supported into bosses formed on the walls of the casing 10, there is a shaft 28 having the portion intermediate the ends journaled into the casing 10, formed of a square section upon which there is non-rotatably mounted the lever 29. The ends of the lever 29 are slotted to receive a corresponding portion of the caps 26, which are retained therein by a roller 31 disposed through the slot 27, and carried by a pin 30 secured into the ends of the lever 29. The shaft 28 extends to the exterior of the casing 10 in such a manner as to permit a handle 32 to be attached thereto for actuating the latter. It is obvious that the rotation of the handle 32 will cause the rotation of the lever 29 with the consequential reciprocation of the valves 23 and 24 in opposite directions.

The bores 21 and 22, and consequently the valves 23 and 24 are in constant communication with the inlet connection 13 by means of an enlarged recess 33 encircling these two valves. Similarly the valve 21 is in constant communication with the connection 14 by means of the recesses 34 and 35, while the valve 24 is in constant communication with the connection 15 by means of recesses 36 and 37.

Formed into the valve block 18 and located adjacent to the different recesses previously mentioned, there are annular grooves 38 within which there is disposed a U-shaped annular packing 39. Radially disposed through the valve 23 and opening into the valve chamber 25, there are two sets of apertures 40 and 41. The valve 24 is likely provided with two sets of radially disposed apertures 42 and 43.

Figure 7:
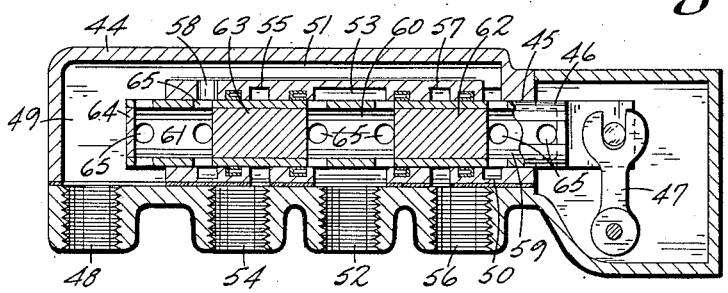
Fig. 7 is a view illustrating a modification of the invention.
Figure 6:
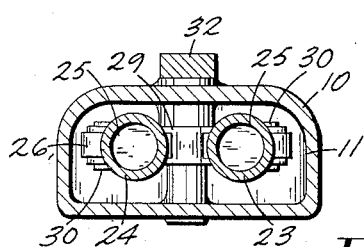
Fig. 6 is a cross sectional view taken in a plane indicated by line 6—6 in Fig. 1.

Fig. 7 illustrates a modification of the invention wherein the valve block 44 is formed with a unitary bore 45, having a valve 46 reciprocable therein. This valve may be actuated by a forked lever 47 connected to a hand operable handle similar to the handle 32. The exhaust connection 48 corresponding to the exhaust connection 16 of the valve illustrated in Fig. 1, is in constant communication with the exhaust chamber 49, and with a groove 50 through a longitudinally disposed passage 51. Adjacent the inlet connection 52, there is formed into the valve block 44 an enlarged annular groove 53 in constant communication with the connection 52. The boss or inlet connection 54 corresponding to the connection 15 of the valve illustrated in Fig. 1, is in constant communication with the valve 46 through an annular recess 55. Similarly the connection 56 is in constant communication with the valve 46 through an annular recess 57. Disposed adjacent the connection 54, and opening into the longitudinal passage 51, there is an annular recess 58.

Intermediate the different mentioned recesses, the valve block 44 is also formed with annular grooves having a U-shaped packing therein. The valve 46 is provided with a plurality of internal chambers 59, 60, and 61 separated from each other by plugs 62 and 63 pressed within the valve. The last chamber 61 is also closed by an expansion plug 64. Leading from these different chambers, there are radially disposed apertures 65, the purpose of which will be explained later.

Referring now to the double valve construction, and assuming the valves positioned as illustrated in Fig. 1, motive fluid admitted into the connection 13, will flow into and remain in the enlarged annular groove 33. Any motive fluid tending to escape therefrom will flow into the annular grooves 38, and act on the packings 39 tending to throw the internal lips thereof toward the valves, affording a fluid tight joint preventing the escape of motive fluid from the recess 33.

Figure 2:
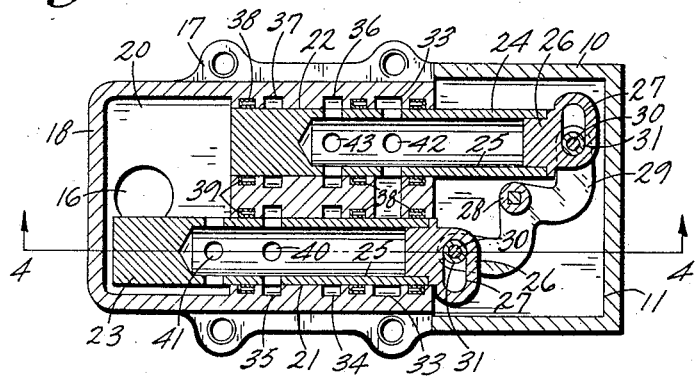
Figs. 2 and 3 are views similar to Fig. 1 illustrating the valves in different position.

When the handle 32 is rotated in one direction to position the valves as illustrated in Fig. 2, motive fluid from the recess 33 is admitted into the valve chamber 25 of the valve 24 through the apertures 42. From the chamber 25, motive fluid will flow into the recess 36 through the apertures 43, and consequently into the connection 15 to be distributed to any desired fluid actuated mechanism. Simultaneously the connection 14 is connected with the exhaust connection 16, through the recess 35, apertures 40 of the valve 23, valve chamber 25 and apertures 41 opening into the exhaust chamber 20. Thus, with one movement of the handle 32, it is possible to control the admission into one of the connections and simultaneously control the exhaust of motive fluid from the other connection.

When the handle is rotated back into the neutral position, the valve 24 will be moved upwardly during the downward movement of the valve 23. These valves being fitted rather freely into the bores 21 and 22 of the valve block 18, will permit the admission of the motive fluid from the inlet recess 33 into the annular grooves 38. Thus the packings 39 are constantly subjected to pressure tending to throw the internal lip thereof against the valves. When the valve 24 is moved upwardly, the apertures 43 are located in such a manner as to move out of connection with the recess 36 prior to the complete disconnection of the apertures 42 with the inlet recess 33. In this manner, motive fluid is allowed to remain in the valve chamber 25 of the valve 24 during the passage of the apertures 42 over the packings 39, permitting thereby the motive fluid to flow through the apertures 42 and act on the packing internal lip to move the latter away from the apertures 42. It is obvious that if motive fluid was not allowed to remain in the valve chamber 25 during the passage of the apertures 42 over the packings, the action of the pressure fluid tending to move the internal lip of the packings toward the valve, would force that lip into the apertures. During the upward movement of the valve, the edge of the apertures 42 would shear the portion of the packings forced therein, necessitating a constant replacement of the packings. It will be seen that by virtue of the U-shaped construction of the packings, the internal area thereof subjected to motive fluid to move the lips away from each other, is smaller than the area subjected to the motive fluid from the apertures. Consequently the pressure acting on the internal lip of the packing from the apertures 42 will not only balance the pressure tending to move the lip inwardly, but will actually move portions of the lips away from the valve.

Figure 3:
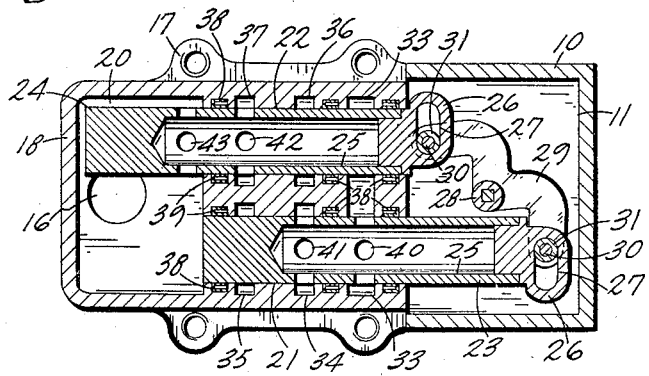
Figure 4:
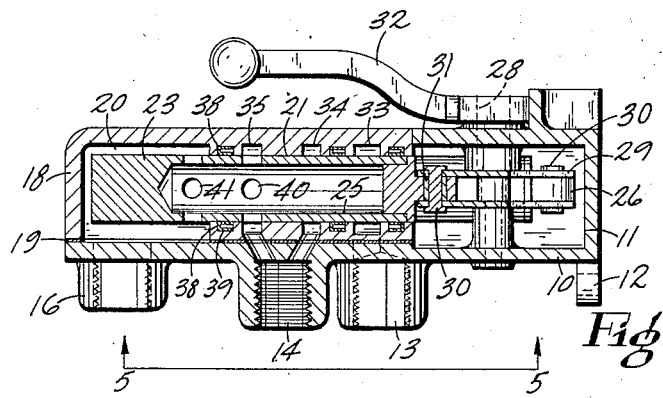
Fig. 4 is a cross sectional view taken in a plane indicated by line 4—4 in Fig. 2.
Figure 5:
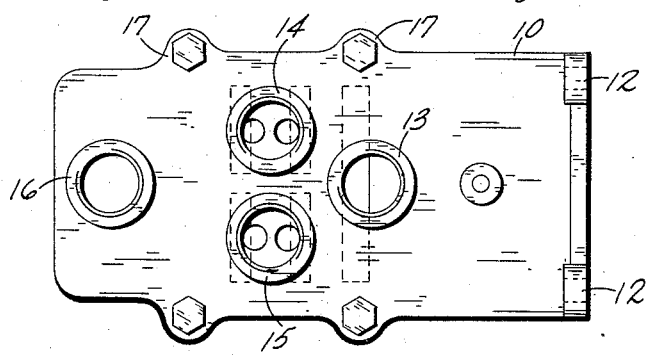
Fig. 5 is a view looking in the direction indicated by the arrows 5—5 in Fig. 4.

When the handle 32 is rotated to position the valves as illustrated in Fig. 3, motive fluid may be admitted into the connection 14 from the inlet recess 33 through the apertures 40 of the valves 23, valve chamber 25, and aperture 41 into the recess 34. Simultaneously motive fluid from the connection 15 may exhaust through the exhaust connection 16, from the recess 37 out through the apertures 42 of the valve 24, valve chamber 25 and apertures 43 into the exhaust chamber 20.

When the handle 32 is again rotated in the neutral position, or when the valve 23 is moved upwardly, the passage of the apertures 40 over the packing disposed between the recesses 33 and 34, is performed as previously explained regarding the passage of the apertures 42.

In the modification illustrated in Fig. 7, the mechanism is reduced to one actuated valve. Assuming this valve to be located at the end of its upward stroke, motive fluid may be admitted into the connection 54 through the apertures 65 connecting the valve chamber 60 with the inlet recess 53 and 54. Simultaneously motive fluid may exhaust from the connection 56 through the apertures 65 connecting the valve chamber 59 with the recess 57 and 50. From this last recess, motive fluid wil flow into the exhaust chamber 49 via the passage 51.

With the valve 46 located at the end of its downward movement, motive fluid may be admitted into the connection 56 through the apertures 65 connecting the valve chamber 60 with the inlet chamber 53 and the recess 57. Simultaneously the motive fluid may be exhausted from the connection 54 through the apertures 65 connecting the valve chamber 61 with the recess 55 and 58. From this last recess motive fluid will flow through the passage 51 into the exhaust chamber 49.

With a valve mechanism of the types described, it is possible to remove the valve block and consequently have accessibility to the valves and other movable parts, without necessitating the disconnection of the several conduits affixed to the casing 10.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a valve, a casing to which a plurality of conduits may be connected, a valve block detachably secured to said casing, said valve block being formed with a bore having a valve member reciprocably mounted therein, recesses within said valve block capable of communication with the conduits connected to said casing, passages within said valve member affording communication between said recesses, and an operable mechanism carried by said casing and connected to said valve member for actuating the latter, said valve block being detachable from said casing irrespective of the connection between said operable mechanism and said valve member.

2. In a valve, a casing to which a plurality of conduits may be connected for conveying motive fluid to and from said casing, a valve block detachably secured to said casing, said valve block containing a valve member capable of movable engagement therewith for controlling the flow of motive fluid between said conduits, and operable mechanism carried by said casing and connected to said valve member for actuating the latter, said valve block being detachable from said casing irrespective of the connection between said operable mechanism and said valve member.

3. In a valve, a casing to which a plurality of conduits may be connected for conveying motive fluid to and from said casing, a lubricant reservoir within said casing, a valve block detachably secured to said casing forming a closure for said lubricant reservoir, a valve member capable of movable engagement with said valve block for controlling the flow of motive fluid between said conduits, and hand operated mechanism mounted in said lubricant reservoir and connected to said valve member for actuating the latter.

4. In a valve, a casing to which a plurality of conduits may be connected for conveying motive fluid to and from said casing, a valve block detachably secured to said casing, a valve member carried by said casing and movable in slidable engagement with said valve block for controlling the flow of motive fluid between said conduits, and hand operable mechanism carried by said casing and connected to said valve member for actuating the latter, said valve block being removable from said casing irrespective of the position of the valve member therein.

5. In a valve, a casing to which a plurality of conduits may be connected for conveying pressure fluid to and from said casing, a valve block detachably secured to said casing, said valve block being formed with a bore having a valve member reciprocably mounted therein, recesses within said valve block capable of communication with the conduits connected to said casing, inlet and outlet passages within said valve member conjoining with each other and capable of communication with said recesses for conveying motive fluid from one of said recesses to the other, packings encircling said valve member and maintained in engagement with the latter by the action of motive fluid exerted on said packings, means for closing said outlet passage previous to the closing of said inlet passage and subjecting said packings to the motive fluid from said inlet passage during the travel of the latter on said packings, thus preventing the penetration of the latter into said inlet passage.

LLOYD G. SPETH.